(12) United States Patent
Zhou et al.

(10) Patent No.: US 9,061,410 B2
(45) Date of Patent: Jun. 23, 2015

(54) POWER TOOL HAVING A CLAMPING DEVICE FOR A WORKING ELEMENT

(75) Inventors: Hongtao Zhou, Nanjing (CN); Guigong Ni, Nanjing (CN)

(73) Assignee: Chervon (HK) Limited, Hong Kong (HK)

( * ) Notice: Subject to any disclaimer, the term of this patent is extended or adjusted under 35 U.S.C. 154(b) by 787 days.

(21) Appl. No.: 13/246,955

(22) Filed: Sep. 28, 2011

(65) Prior Publication Data

US 2012/0086177 A1    Apr. 12, 2012

(30) Foreign Application Priority Data

Oct. 9, 2010 (CN) .......................... 2010 1 0515143
Nov. 24, 2010 (CN) .......................... 2010 1 0574780

(51) Int. Cl.
*B23B 31/10* (2006.01)
*B25F 5/00* (2006.01)
*B23B 31/19* (2006.01)
*B27B 5/32* (2006.01)

(52) U.S. Cl.
CPC .................. *B25F 5/00* (2013.01); *Y10T 279/32* (2015.01); *Y10T 279/33* (2015.01); *B23B 31/19* (2013.01); *B23B 31/10* (2013.01); *B27B 5/32* (2013.01)

(58) Field of Classification Search
CPC ..................................... B25F 5/00; B27B 5/32
USPC ........ 279/141, 43.5, 46.5, 43.1, 46.2; 83/597, 83/697, 339, 331; 30/330, 339, 331; 451/356, 357, 359
See application file for complete search history.

(56) References Cited

U.S. PATENT DOCUMENTS

| | | | | |
|---|---|---|---|---|
| 5,839,196 | A * | 11/1998 | Trott ............................... | 30/339 |
| 6,569,001 | B2 * | 5/2003 | Rudolf et al. ................. | 451/344 |
| 7,344,435 | B2 * | 3/2008 | Pollak et al. .................. | 451/342 |
| 2009/0023371 | A1 * | 1/2009 | Blickle et al. ................. | 451/359 |
| 2011/0266758 | A1 * | 11/2011 | Sergyeyenko et al. ........ | 279/106 |

* cited by examiner

Primary Examiner — Eric A Gates
Assistant Examiner — Chwen-Wei Su
(74) Attorney, Agent, or Firm — Greenberg Traurig, LLP

(57) ABSTRACT

The present disclosure provides a power tool having a clamping device for a working element. The power tool includes an output shaft, a fastening piece having a flange portion for clamping the working element and a protruding shaft substantially perpendicular to the flange portion. A locking assembly comprising a locking member having a first position in which the protruding shaft is locked and a second position in which the protruding shaft is loosened is provided, wherein a pressing member can press the working element between the pressing member and the flange portion when the locking member is in the first position. The power tool can fasten the working element to the output shaft in a simple and reliable manner without the necessary use of such auxiliary tools as a spanner etc. and can achieve a stronger clamping force even under impact conditions.

22 Claims, 9 Drawing Sheets

POWER TOOL HAVING A CLAMPING DEVICE FOR A WORKING ELEMENT

CROSS REFERENCE TO RELATED APPLICATION

This application claims the benefit of Chinese Patent Application Nos. CN201010515143.8, filed Oct. 9, 2010, and CN201010574780.2, filed Nov. 24, 2010, each of which are incorporated herein by reference in their entirety.

FIELD OF THE DISCLOSURE

The present disclosure relates to a power tool comprising an output shaft for driving the tool and a fastening piece for clamping a working element to an end of the output shaft. The tool further comprises a moving device for enabling the fastening piece movable between a released position and a clamped position. At the released position, the fastening piece can be removed from the output shaft by being disengaged from the moving device, and conversely at the clamped position, the fastening piece can lean against the end of the output shaft by locking with the moving device and cooperating with an elastic element such that the working element is firmly clamped.

BACKGROUND OF RELATED ART

A power tool having a quick clamping device is generally known from US 006569001 B2. The described hand-held tool is an angular grinder equipped with a hollow output mandrel therein, wherein a clamping device is mounted in the hollow mandrel and is movable between a clamped position and a released position along the axial direction of the mandrel. The described clamping device includes a clamping flange which is provided with a threaded pin in the middle thereof and is used for cooperating with an opposite flange on the end of the hollow mandrel shaft to clamp a working element therebetween. A thrust component mated with the threaded pin is further arranged in the hollow mandrel. At the clamped position, the threaded pin is screwed into the thread of the trust component and is held in the clamped position under the action of the spring force, and at the released position, the thrust component pushes the threaded pin so as to drive the clamping flange to overcome the spring force and disengage from the surface of the clamped working element. Because there is no frictional force between the clamping flange and the clamped working element when they rotate relative to each other, the threaded pin of the clamping flange can be manually screwed out of the thrust component without the aid of any accessories so that the working element can be replaced conveniently.

Though, for this kind of clamping device, the working element can be substantially clamped to the output shaft of the hand-held tool without any auxiliary tools, however, this clamping device is only suitable for clamping the rotatably driven working element. If the working element is driven by a vibration device such that the working element sways forward and rearward along a longitudinal axis of the output shaft, then this results in a greater transilient torque and a very great impaction occurring in the two rotation directions and it is effectively impossible to ensure the working element to be clamped sufficiently and firmly by means of a known clamping device.

SUMMARY

To improve upon the deficiencies noted in the above prior art, the present disclosure provides a power tool, which can fasten the working element to the output shaft in a simple and reliable manner without the use of such auxiliary tools as a spanner etc. and can achieve a stronger clamping force. Even under impact conditions, which occur in the tool driven by a vibration driver, for example, this clamping force is sufficient enough to ensure the working element to be clamped reliably and firmly.

In order to solve the above technical problem, the present disclosure introduces the following technical solution:

A power tool having a clamping device for a working element, comprising: an output shaft for driving the working element; a fastening piece having a flange portion for clamping the working element and a protruding shaft substantially perpendicular to the flange portion; and a locking assembly comprising a locking member having a first position in which the protruding shaft is locked and a second position in which the protruding shaft is loosened, wherein the power tool further comprises a pressing member, and the working element can be pressed between the pressing member and the flange portion when the locking member is in the first position.

The locking member can move between the first position and the second position and its moving direction is substantially perpendicular to the protruding shaft.

The power tool further comprises a movable device for moving the locking member.

The movable device is partially arranged on the pressing member.

The locking assembly further comprises an intermediate element that can abut against the locking member, wherein the pressing member is provided with a position A and a position B, and there is a height difference between the position A and the position B in the radial direction perpendicular to the protruding shaft, and the intermediate element is selectively placed on the position A or the position B.

The intermediate element is a steel ball or a cylindrical pin.

The radial height difference between the position A and the position B on the pressing member is configured as a stepped plane or a groove.

A biasing element acts on the pressing member for biasing the pressing member toward the flange portion.

The biasing element comprises a first spring.

The power tool further comprises an operation device for moving the pressing member toward a direction to overcome the force exerted by the biasing element.

The operation device comprises a lever element rotatable about a pivot shaft, wherein one end of the lever element abuts against a cam spanner and the other end thereof selectively abuts against an actuating portion provided on the pressing member.

The operation device comprises a rotatable shaft and an operation element for rotating the rotatable shaft about the axis thereof, the rotatable shaft being provided with an eccentric convex surface which can selectively abut against or disengage from the actuating portion arranged on the pressing member.

The locking member and the protruding shaft are respectively provided with formed locking structures for matching with each other.

The formed locking structures comprise a toothed portion arranged on the protruding shaft and a matching toothed portion arranged on the locking member.

An elastic element acts on the locking member and biases the locking member toward a direction D in which the protruding shaft is inserted into a cavity.

A projection is formed on an end surface mated with the flange portion.

The power tool further comprises a disengagement-proof element for preventing the protruding shaft from falling out of the cavity.

The locking assembly further comprises a locking shaft connected with the output shaft, wherein the locking shaft is provided with a first groove mated with the locking member. When the locking member is at a first position to lock the protruding shaft, the locking member is at a first end of the first groove; when the locking member is at a second position to loosen the protruding shaft, the locking member is at a second end of the first groove.

A slidable sleeve is enclosed outside of the locking shaft, wherein the slidable sleeve is provided with a second groove which is mated with the locking member and drives the locking member to move between the first end and the second end.

A second spring acts on the slidable sleeve, and the pressing member can abut against the slidable sleeve such that the slidable sleeve moves in a direction to overcome the spring force of the second spring.

The power tool further comprises an operation spanner which cooperates with the first spring such that the pressing member moves along the direction of the axis of the output shaft.

The operation spanner selectively contacts with or disengages from the pressing member.

The operation spanner is hinged to a housing of the power tool.

An elastic support is arranged between the operation spanner and the housing of the power tool.

By utilizing the above technical solution, the power tool according to the present disclosure has a quick clamping device for the working element, so its usage is convenient and effort-saving, and the structure is simple and compact, and the cost may be largely reduced.

DETAILED DESCRIPTION

Next, various examples of the power tool according to the present disclosure will be further explained with reference to the drawings.

A First Example

Figure 1:
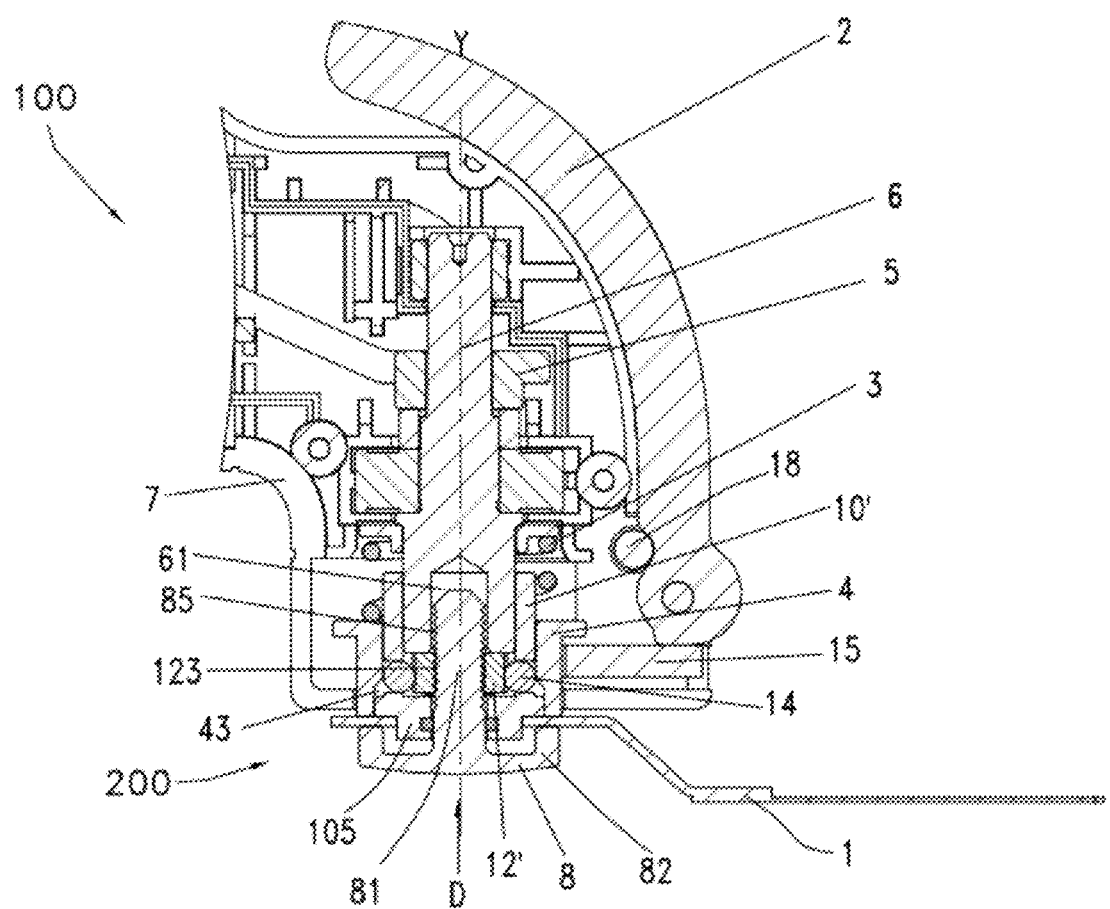
FIG. 1 is a sectional view of a power tool according to a first example of the present disclosure, wherein a clamping device for clamping a working element is in a clamping state.
Figure 2:
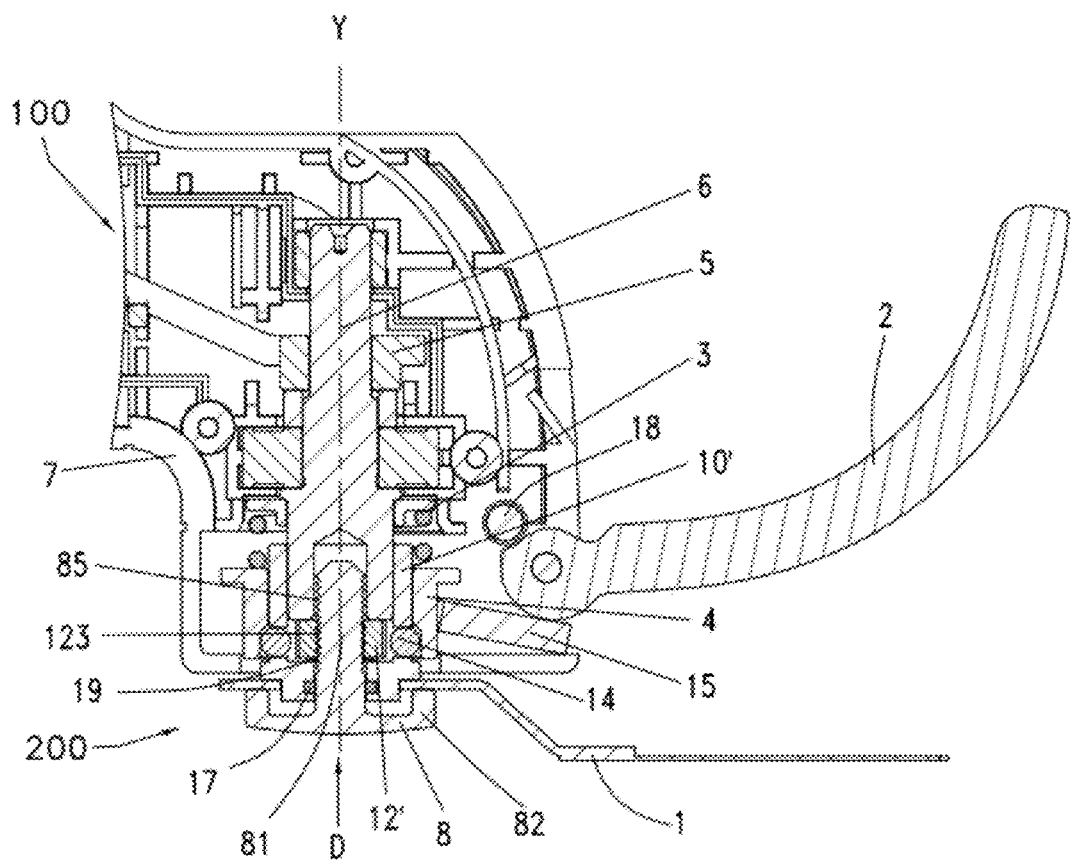
FIG. 2 is a sectional view of a power tool according to the present disclosure, wherein the clamping device for clamping working element is in a releasing state.
Figure 3:
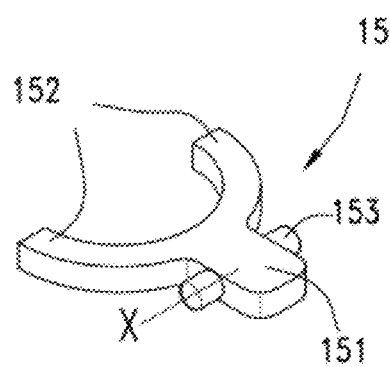
FIG. 3 is a structural schematic view of a fork of the clamping device for moving a pressing block.
Figure 4:
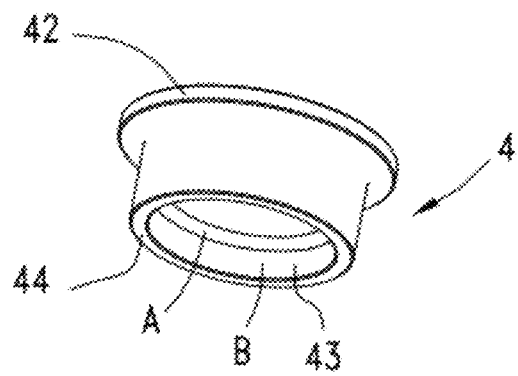
FIG. 4 is a structural schematic view of a pressing block of the clamping device for pressing the working element to a flange portion of a fastening piece.
Figure 6:
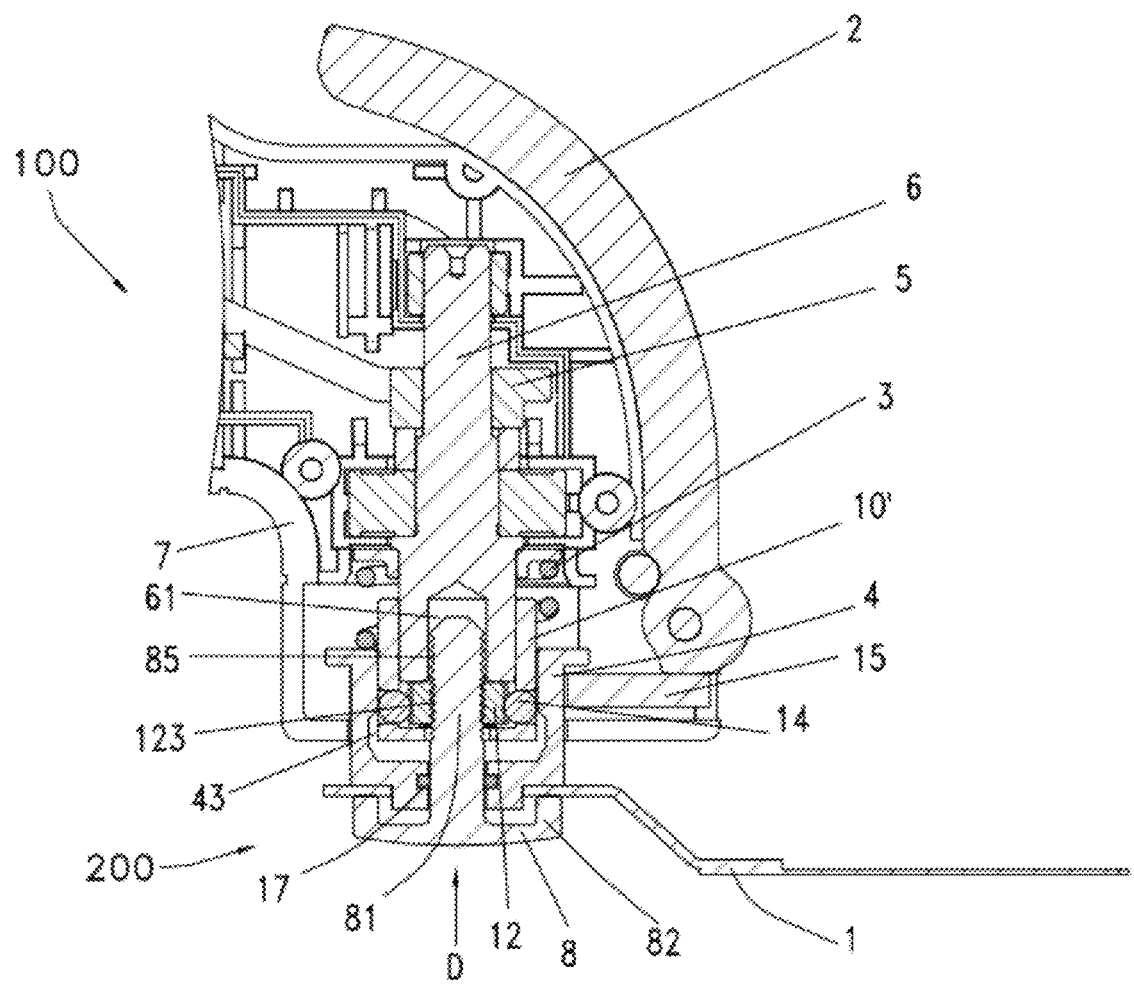
FIG. 6 is a sectional view of the power tool in FIG. 1 but another form of the pressing block is utilized.

As shown in FIGS. 1, 2 and 6, the present disclosure will be illustrated with a power tool 100 as an example which drives a working element 1 in an oscillating manner. A power output shaft 6 of the power tool 100 is supported by bearings and sways back and forth about its axis Y with a small deflection angle and a high frequency under the action of a vibration bracket 5. The power output end of the output shaft 6 is connected with a clamping device 200 for clamping a working element 1. The clamping device 200 comprises a fastening piece 8, a pressing block 4 cooperating with the fastening piece 8 to clamp the working element 1, and a locking assembly for locking the fastening piece 8. The fastening piece 8 is configured to have a flange portion 82 able to clamp the working element 1 and have a protruding shaft 81 substantially perpendicular to the flange portion 82.

The locking assembly comprises a locking shaft 10', a locking member 12' and steel balls 14, wherein the upper end of the locking shaft 10' is connected with the output shaft 6, the shaft-core portions of the locking shaft 10' and the output shaft 6 are configured to have a hollow cavity 61 for receiving the protruding shaft 81. The protruding shaft 81 can be inserted into the cavity 61 and clamped or released by the locking assembly. The output shaft 6, the locking shaft 10' and the protruding shaft 81 locked in the cavity 61 have a common axis Y. The protruding shaft 81 is provided with a toothed portion 85 thereon, and the locking member 12' is provided with a matching toothed portion 123 mated with the toothed portion 85 on the protruding shaft 81; a pressing block 4 is arranged out of the locking shaft 10' and the inner surface of the pressing block 4 is provided with a groove 43 for the steel balls 14 falling into or sliding out. The locking member 12' can move radially under action of the steel balls 14. When the steel balls 14 are placed within the groove 43, the steel balls 14 can partially protrude out of the inner surface of the pressing block 4, and when they slide out of the groove 43, they can abut against the locking member 12' and press the locking member 12' onto the protruding shaft 81. The groove 43 is provided with an inclined plane for the steel balls 14 sliding in or out conveniently. It can be easily understood that, in other examples, the steel balls 14 also can be replaced by the cylindrical pins, and the above groove 43 also can be substituted by other structures such as an inclined plane, a stepped plane and the like, as long as it can achieve an height difference in the direction perpendicular to the radial direction of the protruding shaft 81. It also could be easily known for a person of ordinary skill in the art that, the above inclined plane also can be configured as the shape with the function of self-locking for enhancing reliability of the inclined plane.

The upper end of the pressing block 4 is provided with a spring 3. Under action of the spring 3, the pressing block 4 is biased toward the flange portion 82 of the fastening piece 8. The pressing block 4 is provided with a flange 42 thereon. A shifting end 152 of the fork 15 rotatable about a pivot shaft (the axis X is substantially perpendicular to the axis Y) can abut against the lower surface of the flange 42 so that the pressing block 4 can be pushed to overcome the force of the spring 3 to move away from the flange portion 82. The shifting fork 15 is hingedly supported on the housing 7 by a shaft 153, and a cam spanner 2 acts on an end 151 opposite to the shifting end 152. The clamping device 200 can be easily manipulated by arranging an operation handle of the cam spanner 2 out of the housing 7. Further, the housing 7 is provided with a limit pin 18 for preventing the cam spanner 2 from excessive rotation. It can be easily understood that, in other examples, the flange 42 also can be replaced by other structures such as a recess, a stop block and the like, which also can achieve the function that the pressing block 4 moves along the direction to overcome the force of the spring 3 under the action of the fork 15.

Figure 5:
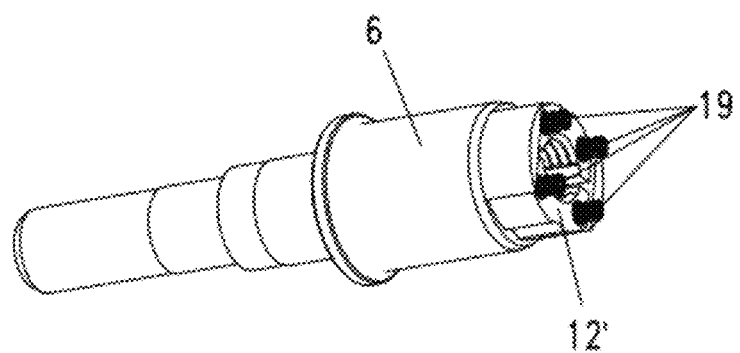
FIG. 5 is a schematic view of an output shaft mounted with a locking assembly thereon, wherein a spring is mounted on one end of the locking member such that the locking member can be floated.

As shown in FIG. 5, a spring 19 is axially placed in the holes of the locking member 12'. With reference to FIG. 2, the other end of the spring 19 abuts against the inner end surface of the locking shaft 10'. The axial height of the locking member 12' is slightly smaller than that of the installation space thereof, thus, under the action of the force of the spring 19, the locking member 12' can be slightly displaced in the axial direction and its function is that: when the teeth of the locking member 12' do not engage with the teeth of the protruding shaft 81 exactly, the locking member 12' can be floated axially such that the teeth are engaged exactly.

Figure 7:
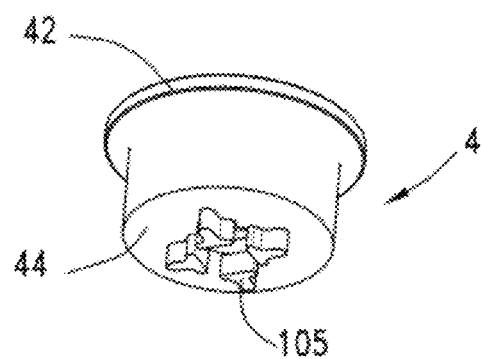
FIG. 7 is a structural schematic view of the pressing block in FIG. 6.

With reference to FIGS. 1, 6 and 7, the projections 105 for transferring torque and driving the working element 1 to deflect can be arranged on the retaining end surface of the locking shaft 10' corresponding to the flange portion 82 of the fastening piece 8 and also can be arranged on the pressed end surface 44 of the pressing block 4. In this example, the pressing block 4 is enclosed outside of the locking shaft 10' by a biasing position in such a manner that the pressing block 4 and the locking shaft 10' can't rotate relative to each other. Moreover, the working element 1 can be clamped between the pressed end surface 44 of the pressing block 4 and the flange portion 82 of the fastening piece 8.

Figure 8:
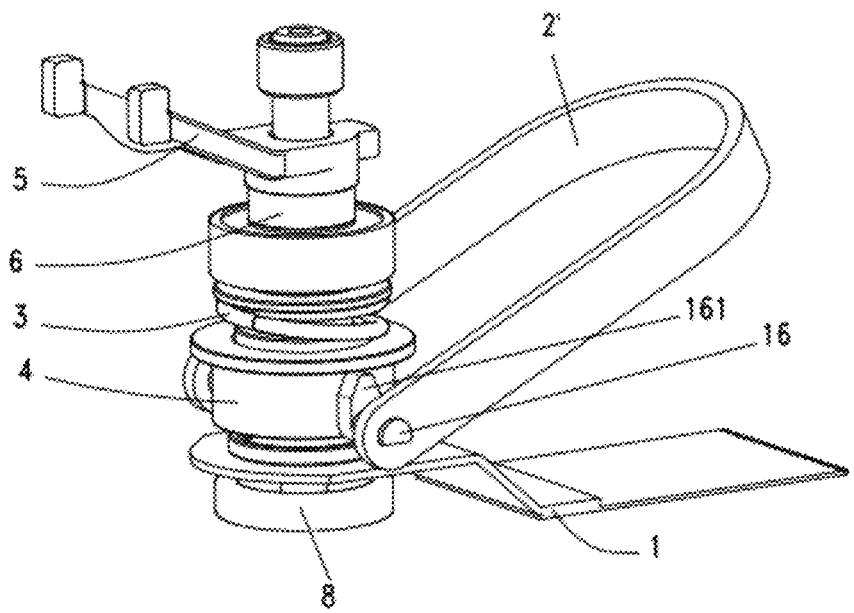
FIG. 8 is a schematic view of the power tool in FIG. 1, but another form of spanner is utilized.
Figure 9:
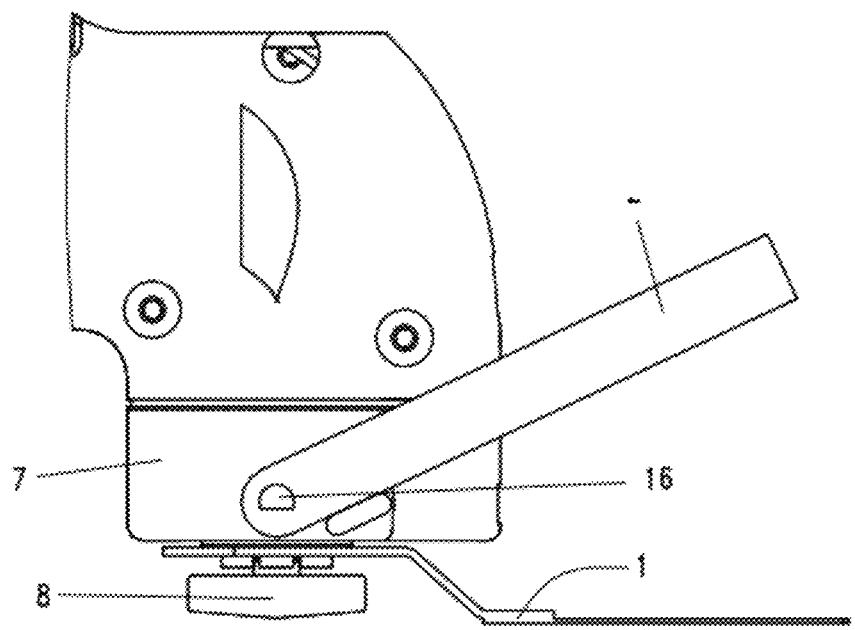
FIG. 9 is a schematic view of the exterior of the power tool in FIG. 8.
Figure 10:
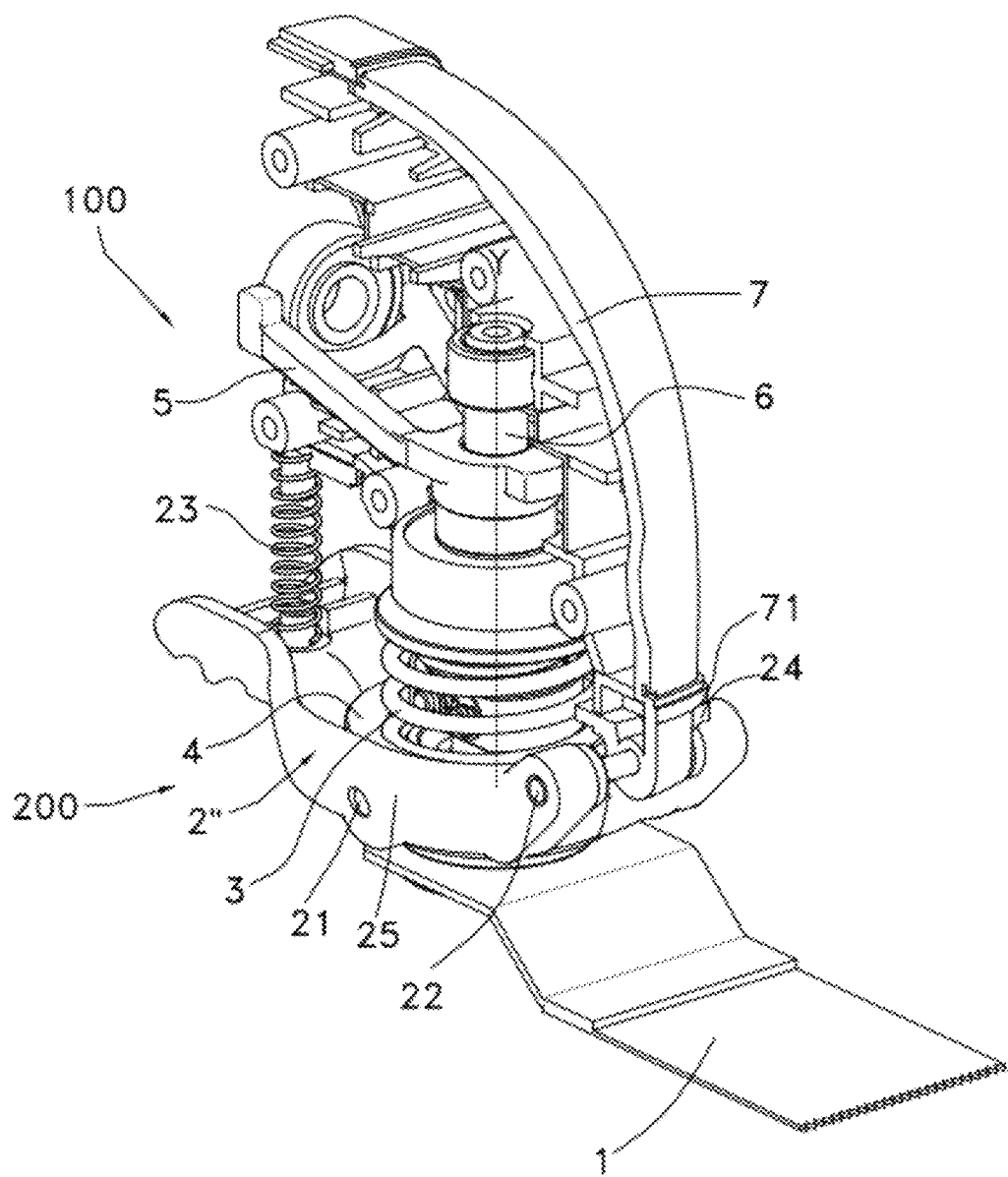
FIG. 10 is an axonometric view of the power tool according to a second example of the present disclosure, illustrating a head area for driving and clamping the working element.

FIGS. 8 and 9 illustrate another example, wherein the pressing block 4 can be manipulated to move. By pulling a big spanner 2', an eccentric shaft 16 can be rotated along therewith and act on the pressing block 4 by the convex surface 161 having different center distances and arranged on the eccentric shaft 16, so as to achieve the purpose that the pressing block 4 moves in the direction of the axis Y to release and clamp the working element 1. While clamping the working element 1, the convex surface 161 of the eccentric shaft 16 disengages from the pressing block 4, and the pressing block 4 biases toward the working element 1 under the action of the force of the spring 3. While releasing the working element 1, the convex surface 161 of the eccentric shaft 16 moves upward against the pressing block 4, and then the working element 1 can be taken down when the spring force exerted on the working element 1 is withdrawn.

In order to prevent the fastening piece 8 from disengaging from the clamping device 200 in a free-falling state when the protruding shaft 81 of the fastening piece 8 is loosened by the locking member 12', a disengagement-proof element 17 such as a damping rubber ring, an elastic piece and the like can be arranged on the inner wall of the cavity of the locking shaft 10'. The disengagement-proof element 17 also can be a magnetic element and further can be arranged on the retaining end surface of the locking shaft 10' that is used for mating with the flange portion.

In this example, the output shaft 6 and the locking shaft 10' are press-fitted together in such a manner that they can't rotate relative to each other, which facilitates the manufacturing and assembling of the clamping device. In other examples, the output shaft 6 and the locking shaft 10' also can be integrally formed by the same shaft.

According to the above examples the manner of manipulating the power tool to clamp or release the working element will be described as follows.

FIG. 1 is a schematic view illustrating the clamping device 200 in the clamped state. A short diameter eccentric surface of the cam spanner 2 abuts against one end 151 of the fork 15, and at the same time, the shifting end 152 opposite to the end 151 is in the state of disengaging from the flange 42 of the pressing block 4. Accordingly, under the action of the force of the spring 3, the pressing block 4 biases toward the working element 1, and meanwhile the downward movement of the pressing block 4 pushes the steel balls 14 to press toward the locking member 12' such that the matching toothed portion 123 of the locking member 12' engages with the toothed portion 85 of the protruding shaft 81, thus, the protruding shaft 81 is limited in the axial direction (i.e. the direction of the axis Y) and further the working element 1 is clamped between the flange portion 82 of the fastening piece 8 and the pressing block 4.

FIG. 2 is a schematic view illustrating the clamping device 200 in the released state. The cam spanner 2 is shifted to one end 151 of the fork 15 toward which the long diameter eccentric surface of the cam spanner 2 is pressed, then the shifting end 152 opposite to the end 151 abuts against the flange 42 of the pressing block 4 so as to lift the pressing block 4. With the upward movement of the pressing block 4, the force exerted on the working element 1 is withdrawn, and the groove 43 arranged on the pressing block 4 is just moved to the position corresponding to the steel balls 14 with the upward movement of the pressing block 4. At this time, the fastening piece 8 is pulled downwardly so that the two locking members 12' can be separated radially. Simultaneously, the two steel balls 14 roll into the groove 43 of the pressing block 4 to vacate the space for radially opening the locking member 12', such that the toothed portion 85 of the protruding shaft 81 of the fastening piece 8 disengages from the matching toothed portion 123 of the locking member 12'. In this way, the fastening piece 8 can be pulled out successfully and then the working element 1 can be removed therefrom.

A Second Example

As shown in FIGS. 10 to 14, a power output shaft 6 of a power tool 100 is supported by the bearings and sways back and forth about its axis Y with a small deflection angle and a high frequency under the action of a vibration bracket 5. The power output end of the output shaft 6 is connected with a clamping device 200 that is used for clamping a working element 1. The clamping device 200 comprises a fastening piece 8, a pressing block 4 for cooperating with the fastening piece 8 to clamp the working element 1, and a locking assembly for locking the fastening piece 8. The fastening piece 8 is configured to have a flange portion 82 able to clamp the working element and have a protruding shaft 81 substantially perpendicular to the flange portion 82.

The locking assembly comprises a locking shaft 10, a slidable sleeve 11 and a locking member 12, wherein the locking shaft 10 is configured as a hollow member in which the hollow cavity 61' is used for receiving the protruding shaft 81, and the upper end of the locking shaft 10 is connected with the output shaft 6. The output shaft 6, the locking shaft 10 and the protruding shaft 81 locked in the locking shaft 10 have a common axis Y. The locking shaft 10 is further provided with a first grooves 102 and 102' which are mated with the locking member 12 and have a first end 103 near the axis Y and a second end 104 away from the axis Y. In the present example, the first grooves 102 and 102' are arranged as slanted grooves which form an angle with the axis Y and have a self-locking function. The slidable sleeve 11 is enclosed outside of the locking shaft 10 and can slide along the direction of the axis Y and is provided with second grooves 111 and 111' mated with the locking member 12.

In this example, the locking member 12 includes two rollers arranged symmetrically relative to the axis Y, which are provided with a mounting portion 121 and a clamping portion 122, wherein the mounting portion 121 is simultaneously mated with the first grooves 102, 102' and the second grooves 111, 111' and the clamping portion 122 is mated with a flat plane 84 on the protruding shaft 81. When the slidable sleeve 11 moves toward the direction of the axis Y, the locking member 12 is driven by the second grooves 111, 111' to move between the first end 103 and the second end 104 of the first grooves 102, 102'. When the locking member 12 is placed on the first end 103 of the first grooves, the protruding shaft 81 of the fastening piece is clamped so as to lock the fastening piece 8 axially. When the locking member 12 is placed on the second end 104 of the first grooves, the protruding shaft 81 of the fastening piece is loosened so that the fastening piece 8 can be taken out of the locking shaft 10.

The clamping device 200 further comprises an operation spanner 2" for moving the pressing block 4, wherein the operation spanner 2" is mated with a first spring 3 such that the pressing block 4 can be moved along the direction of the axis Y. One end of the first spring 3 can be placed in the circular groove 41 arranged on the pressing block 4. The spanner 2" is pivotably connected to a housing 7 about the pivot shaft 22 and surrounds outside of the pressing block 4 in the form of fork. Front and rear fork arms 25 of the spanner 2" are respectively provided with a protruding column projecting out of the inner surface thereof. In the present example, the protruding column is provided by the pin column 21 that is pressed into the spanner via an interference-fit. In other examples, the protruding column also can be formed on the spanner directly, and one end of the pin column 21 projects out of the inner surface of the fork arm 25 and can cooperate with the flange 42 arranged on the pressing block 4. A third spring 23 is provided between the spanner 2" and the housing 7. When the working element 1 is clamped and vibrates with deflection, the third spring 23 pushes the spanner 2" to rotate about the pivot shaft 22 such that the pin columns 21 disengages from the flange 42, accordingly, it can ensure the output of vibration of the tool can not be delivered to the spanner 2". The spanner 2" and the housing 7 are respectively provided with limiting structures 24, 71 for cooperating with the third spring 23 such that the spanner 2" is suspended at a certain angle about the pivot shaft 22.

In the present example, a boss 83 is formed on the flange portion 82 for transferring torque and driving the working element 1 to sway with deflection. In other examples, the boss for transferring torque also can be arranged on the end surface of the locking shaft mated with the flange portion of the fastening piece, or arranged on the end surface of the pressing block cooperated with the flange portion of the fastening piece.

Figure 11:
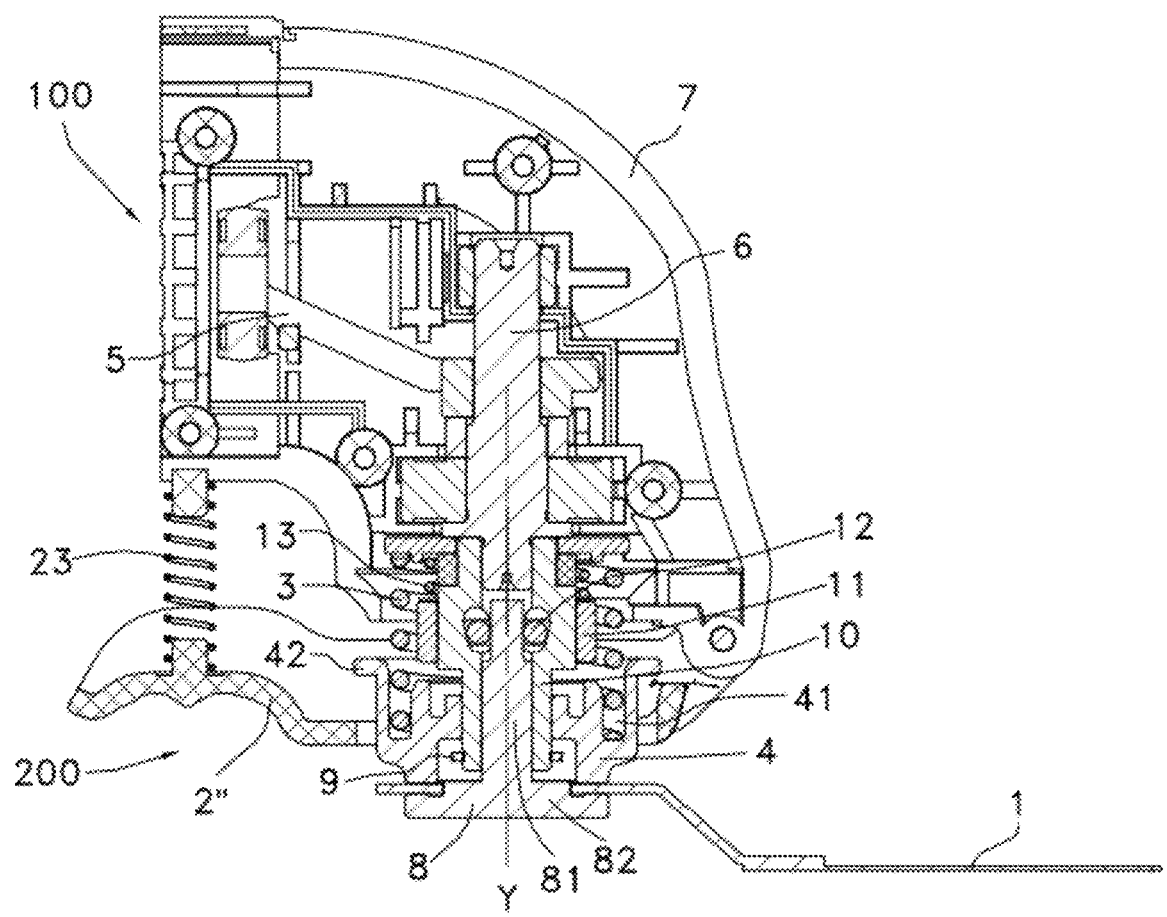
FIG. 11 is a sectional view of the power tool in FIG. 10, wherein the working element is in a state of being clamped by the clamping device, and at the same time, the locking member is at a first position to lock the protruding shaft of the fastening piece.
Figure 12:
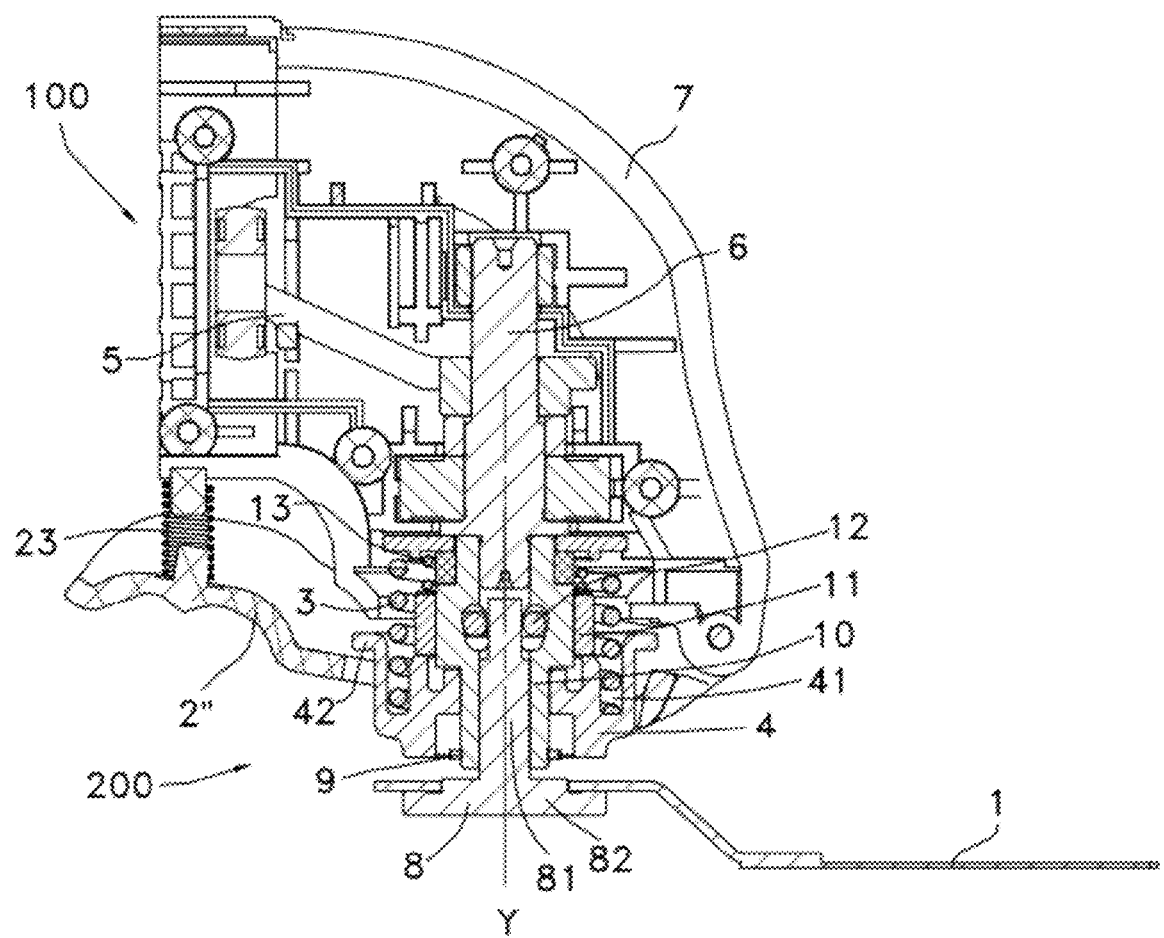
FIG. 12 is a sectional view of the power tool in FIG. 10, wherein the working element is in a state of being released by the clamping device, and at the same time, the locking member is at a second position to release the protruding shaft of the fastening piece.
Figure 13:
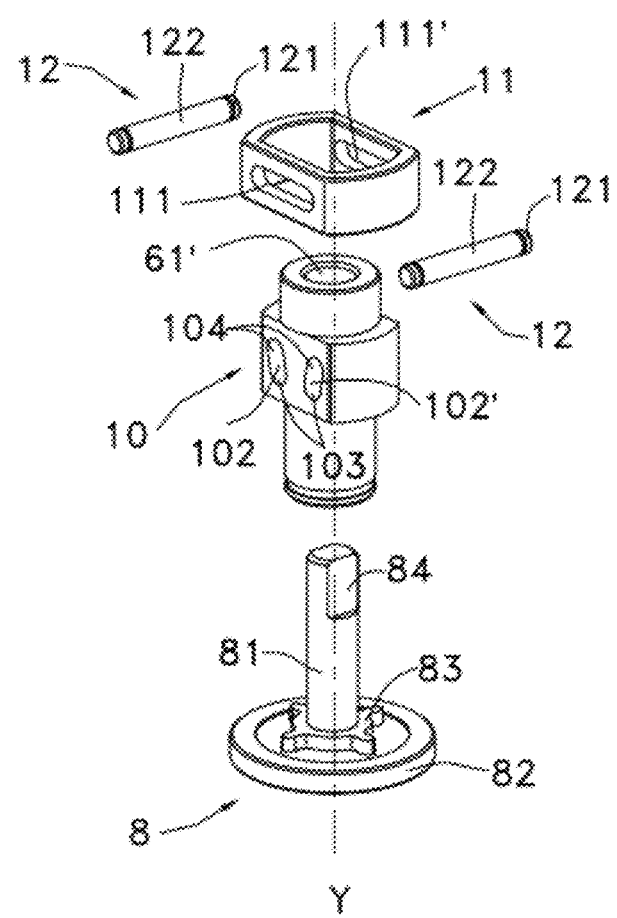
FIG. 13 is an exploded view of parts of the locking assembly of the power tool in FIG. 10 which can axially lock the fastening piece.

Referring to FIGS. 11 and 12, according to the above second example, the course for operating the power tool to clamp or release the working element will be described as follows.

The course to install the working element is that:

At first, the spanner 2" is lifted upwardly and rotates about the pivot shaft 22. Accordingly, the pin columns 21 push the pressing block 4 to move upwardly. Gradually, one end of the pressing block 4 contacts with the slidable sleeve 11 and then pushes the slidable sleeve 11 to move upwardly. Subsequently, the roller-shaped locking member 12 can move upwardly along the inclined first grooves 102, 102' on the locking shaft 10 and the two locking members 12 are separated from each other. At this time, the fastening piece 8 together with the working element 1 can be manually pressed onto the retaining end surface of the pressing block 4.

Then, the spanner 2" is released, the slidable sleeve 11 moves downwardly under the action of the second spring 13 and drives the locking member 12 to clamp the protruding shaft 81 of the fastening piece 8, so that the fastening piece 8 is axially fixed. Further, the pressing block 4 continues to move downwardly under the action of the first spring 3 to press the working element 1 onto the clamping flange portion of the fastening piece 8.

The course to uninstall the working element is that:

At first, the spanner 2" is lifted upwardly and rotates about the pivot shaft 22. Accordingly, the pin column 21 pushes the pressing block 4 to move upwardly so that the first spring 3 is compressed and the clamping force exerted on the working element 1 is withdrawn. Gradually, one end of the pressing block 4 contacts with the slidable sleeve 11 and then pushes the slidable sleeve 11 to move upwardly. Subsequently, the roller-shaped locking member 12 can move upwardly along the first inclined grooves 102, 102' on the locking shaft 10 and the two locking members 12 are separated from each other, so that the clamping force exerted on the protruding shaft 81 is withdrawn, and at the same time the protruding shaft 8 can be taken out of the locking shaft 10 so that the fastening piece 8 and the working element 1 can be taken down.

After the spanner 2" is released, the slidable block 11 is restored under the action of the second spring 13 and the pressing block 4 is restored to the position set by a retainer ring 9 under the action of the first spring 3, wherein the retainer ring 9 is arranged on the locking shaft 10.

We claim:

1. A power tool having a clamping device for a working element, comprising:
    an output shaft for driving the working element;
    a fastening piece having a flange portion for clamping the working element and a protruding shaft substantially perpendicular to the flange portion;
    a locking assembly comprising a locking member, the locking member having a first position in which the protruding shaft is locked and a second position in which the protruding shaft is loosened;
    a pressing member comprising a biasing element acting on the pressing member for biasing the pressing member toward the flange portion, wherein the working element can be pressed between the pressing member and the flange portion when the locking member is in the first position; and
    an operation device for moving the pressing member toward a direction to overcome the force exerted by the biasing element.

2. The power tool having the clamping device for the working element according to claim 1, wherein the locking member can move between the first position and the second position and the locking member moving direction is substantially perpendicular to the protruding shaft.

3. The power tool having the clamping device for the working element according to claim 2, wherein the power tool further comprises a movable device for moving the locking member.

4. The power tool having the clamping device for the working element according to claim 3, wherein the movable device is partially arranged on the pressing member.

5. The power tool having the clamping device for the working element according to claim 4, wherein the locking assembly further comprises:
an intermediate element that can abut against on the locking member, and the pressing member is provided with a first position (A) and a second position (B), and there is a height difference between the first position (A) and the second position (B) in the radial direction perpendicular to the protruding shaft, and the intermediate element is selectively placed on the first position A or the second position (B).

6. The power tool having the clamping device for the working element according to claim 5, wherein the intermediate element is a steel ball or a cylindrical pin.

7. The power tool having the clamping device for the working element according to claim 6, wherein the radial height difference between the first position (A) and the second position (B) on the pressing member is configured as at least one of a stepped plane or a groove.

8. The power tool having the clamping device for the working element according to claim 1, wherein the biasing element comprises a first spring.

9. The power tool having the clamping device for the working element according to claim 1, wherein the operation device comprises a lever element rotatable about a pivot shaft, and one end of the lever element abuts against a cam spanner and the other end thereof selectively abuts against an actuating portion provided on the pressing member.

10. The power tool having the clamping device for the working element according to claim 1, wherein the operation device comprises a rotatable shaft and an operation element for rotating the rotatable shaft about the axis thereof, and the rotatable shaft is provided with an eccentric convex surface which can selectively abut against or disengage from the actuating portion arranged on the pressing member.

11. The power tool having the clamping device for the working element according to claim 1, wherein the locking member and the protruding shaft are respectively provided with formed locking structures for matching with each other.

12. The power tool having the clamping device for the working element according to claim 11, wherein the formed locking structures comprise a toothed portion arranged on the protruding shaft and a matching toothed portion arranged on the locking member.

13. The power tool having the clamping device for the working element according to claim 12, wherein an elastic element acts on the locking member and biases the locking member toward a direction (D) in which the protruding shaft is inserted into a cavity.

14. The power tool having the clamping device for the working element according to claim 1, wherein a projection is formed on an end surface mated with the flange portion.

15. The power tool having the clamping device for the working element according to claim 1, wherein the power tool further comprises a disengagement-proof element for preventing the protruding shaft from falling out of the cavity.

16. The power tool having the clamping device for the working element according to claim 1, wherein the locking assembly further comprises:
a locking shaft connected with the output shaft, the locking shaft being provided with a first groove mated with the locking member, wherein the locking member is at a first end of the first groove when the locking member is at a first position to lock the protruding shaft; and
the locking member is at a second end of the first groove when the locking member is at a second position to loosen the protruding shaft.

17. The power tool having the clamping device for the working element according to claim 16, wherein a slidable sleeve is enclosed outside of the locking shaft and is provided with a second groove which is mated with the locking member and drives the locking member to move between the first end and the second end.

18. The power tool having the clamping device for the working element according to claim 17, wherein a second spring acts on the slidable sleeve, and the pressing member can abut against the slidable sleeve such that the slidable sleeve moves in a direction to overcome the spring force of the second spring.

19. The power tool having the clamping device for the working element according to claim 16, wherein the power tool further comprises an operation spanner which cooperates with the biasing element such that the pressing member moves along the direction of the axis of the output shaft.

20. The power tool having the clamping device for the working element according to claim 19, wherein the operative spanner contacts with or disengages from the pressing member selectively.

21. The power tool having the clamping device for the working element according to claim 20, wherein the operation spanner is hinged to a housing of the power tool.

22. The power tool having the clamping device for the working element according to claim 20 wherein an elastic support is arranged between the operation spanner and the housing of the power tool.

* * * * *